United States Patent
Tang et al.

(10) Patent No.: US 8,958,550 B2
(45) Date of Patent: Feb. 17, 2015

(54) ENCRYPTION OPERATION WITH REAL DATA ROUNDS, DUMMY DATA ROUNDS, AND DELAY PERIODS

(75) Inventors: Lawrence W. Tang, San Diego, CA (US); An Tonthat, San Diego, CA (US)

(73) Assignee: Combined Conditional Access Development & Support. LLC (CCAD), San Diego, CA (US)

( * ) Notice: Subject to any disclaimer, the term of this patent is extended or adjusted under 35 U.S.C. 154(b) by 6 days.

(21) Appl. No.: 13/230,872

(22) Filed: Sep. 13, 2011

(65) Prior Publication Data

US 2013/0064362 A1 Mar. 14, 2013

(51) Int. Cl.
| | |
|---|---|
| H04L 9/06 | (2006.01) |
| H04L 9/28 | (2006.01) |
| H04L 9/32 | (2006.01) |
| H04L 9/00 | (2006.01) |

(52) U.S. Cl.
CPC .............. *H04L 9/002* (2013.01); *H04L 9/0631* (2013.01)
USPC ............................................. 380/29; 380/28

(58) Field of Classification Search
CPC ....... H04L 9/002; H04L 9/003; H04L 9/0612; H04L 9/0625; H04L 9/0631; H04L 2209/08; H04L 2209/12; H04L 2209/125; H04L 2209/24; G06F 21/558
See application file for complete search history.

(56) References Cited

U.S. PATENT DOCUMENTS

| | | | | |
|---|---|---|---|---|
| 4,447,672 A | * | 5/1984 | Nakamura | 380/264 |
| 4,654,480 A | * | 3/1987 | Weiss | 713/181 |
| 5,822,561 A | * | 10/1998 | Nakajima | 712/219 |
| 6,078,665 A | * | 6/2000 | Anderson et al. | 380/28 |
| 6,327,661 B1 | * | 12/2001 | Kocher et al. | 713/193 |
| 6,343,281 B1 | * | 1/2002 | Kato | 705/57 |
| 6,363,152 B1 | * | 3/2002 | Cornelius et al. | 380/255 |
| 6,804,355 B1 | * | 10/2004 | Graunke | 380/37 |
| 7,170,949 B2 | * | 1/2007 | Schoenborn | 375/286 |

(Continued)

FOREIGN PATENT DOCUMENTS

| | | | |
|---|---|---|---|
| JP | 2006054568 A | * | 2/2006 |
| JP | 2007195132 A | * | 8/2007 |

OTHER PUBLICATIONS

Francois, "Physical Design of Cryptographic Applications: Constrained Environments and Power Analysis Resistance", Universite Catholique de Louvain, Belgium, 2008, 218 pages.*

(Continued)

*Primary Examiner* — Andrew Nalven
*Assistant Examiner* — Walter Malinowski
(74) *Attorney, Agent, or Firm* — Banner & Witcoff, Ltd.

(57) ABSTRACT

An apparatus, method, system and computer-readable medium are provided for preserving an encryption of data when confronted by an attack, such as a side channel analysis (SCA) attack based on a statistical analysis. In some embodiments, hardware, software, and/or firmware associated with an encryption calculation may be exercised or accessed during a background operation when an actual or real operation is not taking place. During the background operation, dummy values for data and one or more keys may be input to the hardware. A switching between the real operation and the background operation may take place seamlessly such that measurement of a physical characteristic associated with the hardware is indistinguishable in terms of when the real and background operations are active. In this manner, the secrecy of a key used in connection with the real operation may be preserved.

20 Claims, 6 Drawing Sheets

(56) References Cited

U.S. PATENT DOCUMENTS

| | | | |
|---|---|---|---|
| 7,295,671 B2* | 11/2007 | Snell | 380/28 |
| 7,587,590 B2* | 9/2009 | Yamada et al. | 713/161 |
| 7,742,597 B2* | 6/2010 | Lewis | 380/28 |
| 7,764,786 B2* | 7/2010 | Liardet et al. | 380/28 |
| 7,848,515 B2* | 12/2010 | Dupaquis et al. | 380/28 |
| 2002/0051534 A1* | 5/2002 | Matchett et al. | 380/37 |
| 2002/0059522 A1* | 5/2002 | Hirano et al. | 713/193 |
| 2003/0093578 A1* | 5/2003 | Minnick et al. | 709/318 |
| 2004/0044896 A1* | 3/2004 | Kelley et al. | 713/183 |
| 2004/0046645 A1* | 3/2004 | Atkins et al. | 340/10.51 |
| 2004/0071290 A1* | 4/2004 | Lim | 380/37 |
| 2005/0221889 A1* | 10/2005 | Dupray et al. | 463/29 |
| 2005/0261898 A1* | 11/2005 | Van Klinken | 704/219 |
| 2005/0271202 A1* | 12/2005 | Shu et al. | 380/29 |
| 2006/0056620 A1* | 3/2006 | Shingal et al. | 380/28 |
| 2006/0227965 A1* | 10/2006 | Zhu et al. | 380/37 |
| 2006/0294059 A1* | 12/2006 | Chamberlain et al. | 707/3 |
| 2007/0014395 A1* | 1/2007 | Joshi et al. | 380/28 |
| 2007/0075732 A1* | 4/2007 | Fruhauf et al. | 326/38 |
| 2007/0076748 A1* | 4/2007 | Nakagawa | 370/463 |
| 2007/0234072 A1* | 10/2007 | Kudelski | 713/190 |
| 2007/0265978 A1* | 11/2007 | Kahn et al. | 705/59 |
| 2007/0286416 A1* | 12/2007 | Bertoni et al. | 380/37 |
| 2008/0019503 A1* | 1/2008 | Dupaquis et al. | 380/28 |
| 2008/0075279 A1* | 3/2008 | Yoon et al. | 380/44 |
| 2008/0152142 A1* | 6/2008 | Buer et al. | 380/270 |
| 2008/0263361 A1* | 10/2008 | Dutta et al. | 713/182 |
| 2009/0129585 A1* | 5/2009 | Lewis | 380/28 |
| 2009/0172055 A1* | 7/2009 | Radja et al. | 708/251 |
| 2009/0228542 A1* | 9/2009 | Meijer et al. | 709/201 |
| 2009/0310778 A1* | 12/2009 | Mueller et al. | 380/44 |
| 2009/0327382 A1* | 12/2009 | Hisakado | 708/252 |
| 2009/0327664 A1* | 12/2009 | Yoshimi | 712/221 |
| 2010/0017870 A1* | 1/2010 | Kargupta | 726/14 |
| 2010/0074441 A1* | 3/2010 | Pauker et al. | 380/45 |
| 2010/0115286 A1* | 5/2010 | Hawkes et al. | 713/189 |
| 2010/0142705 A1* | 6/2010 | Reffe | 380/46 |
| 2010/0153747 A1* | 6/2010 | Asnaashari et al. | 380/29 |
| 2010/0211787 A1* | 8/2010 | Bukshpun et al. | 713/170 |
| 2010/0318811 A1* | 12/2010 | Motoyama | 713/190 |
| 2011/0103579 A1* | 5/2011 | Martin et al. | 380/28 |
| 2011/0209226 A1* | 8/2011 | Saito et al. | 726/27 |
| 2011/0252244 A1* | 10/2011 | Lesea et al. | 713/192 |
| 2012/0039469 A1* | 2/2012 | Mueller et al. | 380/252 |
| 2012/0121080 A1* | 5/2012 | Kerschbaum | 380/28 |
| 2012/0185683 A1* | 7/2012 | Krstic et al. | 713/2 |
| 2013/0223624 A1* | 8/2013 | Suzaki et al. | 380/44 |

OTHER PUBLICATIONS

Lu, "Is the Differential Frequency-Based Attack Effective against Random Delay Insertion", SiPS 2009, IEEE 2009, pp. 51-56.*

Rusinowitch, "Protocol Insecurity with a Finite Number of Sessions and Composed Keys is NP-complete", Computer Security Foundations Workshop, Mar. 2002.*

Teergarden, "Side-Channel Attack Resistant ROM-Based AES S-Box", IEEE International Symposium on Hardware-Oriented Security and Trust (HOST), 2010, pp. 124-129.*

Gurkaynak, "Improving DPA Security by Using Globally-Asynchronous Locally-Synchronous Systems", Proceedings of ESSCIRC, Grenoble France 2005, pp. 407-410.*

Boey, "Random Clock against Differential Power Analysis", 2010 IEEE Asia Pacific Conference on Circuits and Systems (APCCAS), Dec. 6-9, 2010, pp. 756-759.*

Ambrose, "RIJID: Random Code Injection to Mask Power Analysis based Side Channel Attacks", DAC '07 Proceedings of the 44th annual Design Automation Conference, ACM, 2007, New York, New York, pp. 489-492.*

Metra, "On-Line Testing of Transient and Crosstalk Faults Affecting Interconnections of FPGA-Implemented Systems", ITC International Test Conference, 2001, Paper 33.3, pp. 939-947.*

Ozev, "Cost-Effective Concurrent Test Hardware Design for Linear Analog Circuits", IEEE International Conference on Computer Design, VLSI in Computers and Processors (ICCD'02), 2002, 7 pages.*

* cited by examiner

ENCRYPTION OPERATION WITH REAL DATA ROUNDS, DUMMY DATA ROUNDS, AND DELAY PERIODS

BACKGROUND

Encryption is a process that may be used to maintain the secrecy or privacy associated with data by making that data indecipherable except to those possessing special knowledge. That special knowledge may take the form of one or more keys. Decryption is the counterpart to encryption and is used to recover or access the data. For legitimate or authorized users, the decryption may take place via the use of the one or more keys.

Unauthorized users that do not have access to the special knowledge (e.g., the key(s)) may still wish to obtain the data. For example, the data may have value to the unauthorized users. Such value may include financial value, political value, and social value, for example.

Side channel analysis (SCA), sometimes referred to as a side channel attack, is one technique unauthorized users have implemented to obtain the data. SCA is based on information gained from the physical qualities or characteristics of a device or system performing the encryption. SCA may be based on obtaining a profile of timing (e.g., measuring how much time various computations take to perform), power (e.g., measuring power consumption), electromagnetic radiation (e.g., measuring emitted radiation), and/or acoustic (e.g., measuring sound produced) characteristics.

Conventional solutions for addressing SCA include hardware mirroring and the exercising of additional substitution boxes (S-boxes). Hardware mirroring is used to obtain a consistent (e.g., a flat) profile by ensuring that access to internal hardware, such as hardware registers or gates, appears similar, thereby preventing identification of a specific exercise of any particular hardware element.

Hardware mirroring is expensive in terms of fabrication and development costs, as hardware mirroring requires greater hardware complexity. Exercising additional S-boxes is expensive from a power consumption perspective, as more S-boxes are exercised (and hence, draw more power) than are actually needed.

SUMMARY

This summary is not intended to identify critical or essential features of the disclosure provided herein, but instead merely summarizes certain features and variations thereof.

In some illustrative embodiments, in order to combat access by unauthorized users, such as via side channel analysis (SCA) attacks, hardware configured to provide encrypted data may be continuously exercised or accessed. The continuous exercising of the hardware may take place in connection with an immediate selection of actual data and one or more actual keys and dummy (e.g., randomly generated) values for the data and key(s). In one aspect, by providing for a continuous exercise of the hardware by immediately switching in-and-out actual and dummy values, unauthorized users may incur difficulty in identifying a time a specific substitution box (S-box) is accessed or exercised in connection with a real encryption operation.

Other aspects, details, and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Various connections between elements are discussed in the following description. These connections are general and, unless specified otherwise, may be for example direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
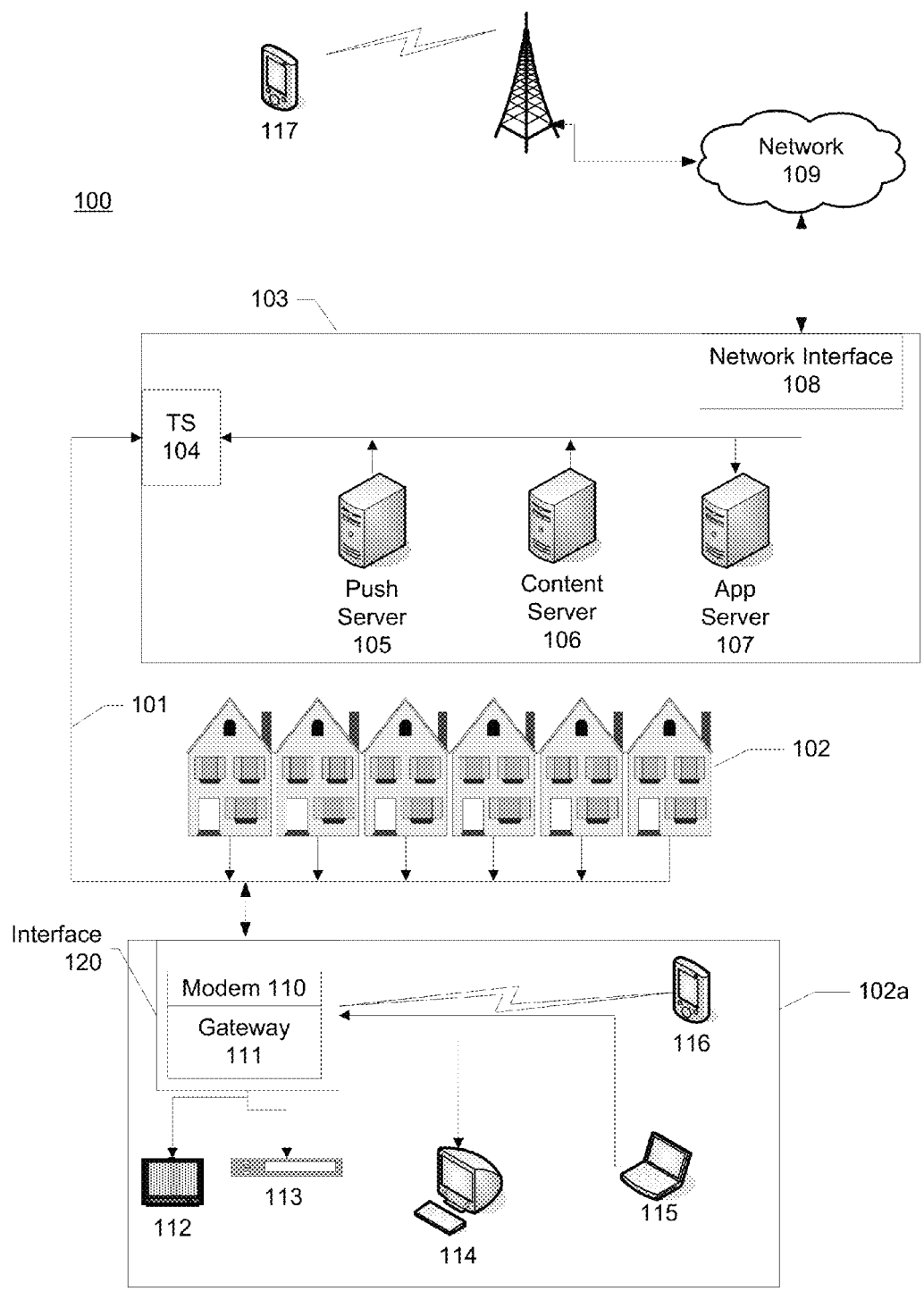
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. Cable-Labs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102a may include an interface 120. Interface 120 may comprise a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the premises 102a to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the premises 102a, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
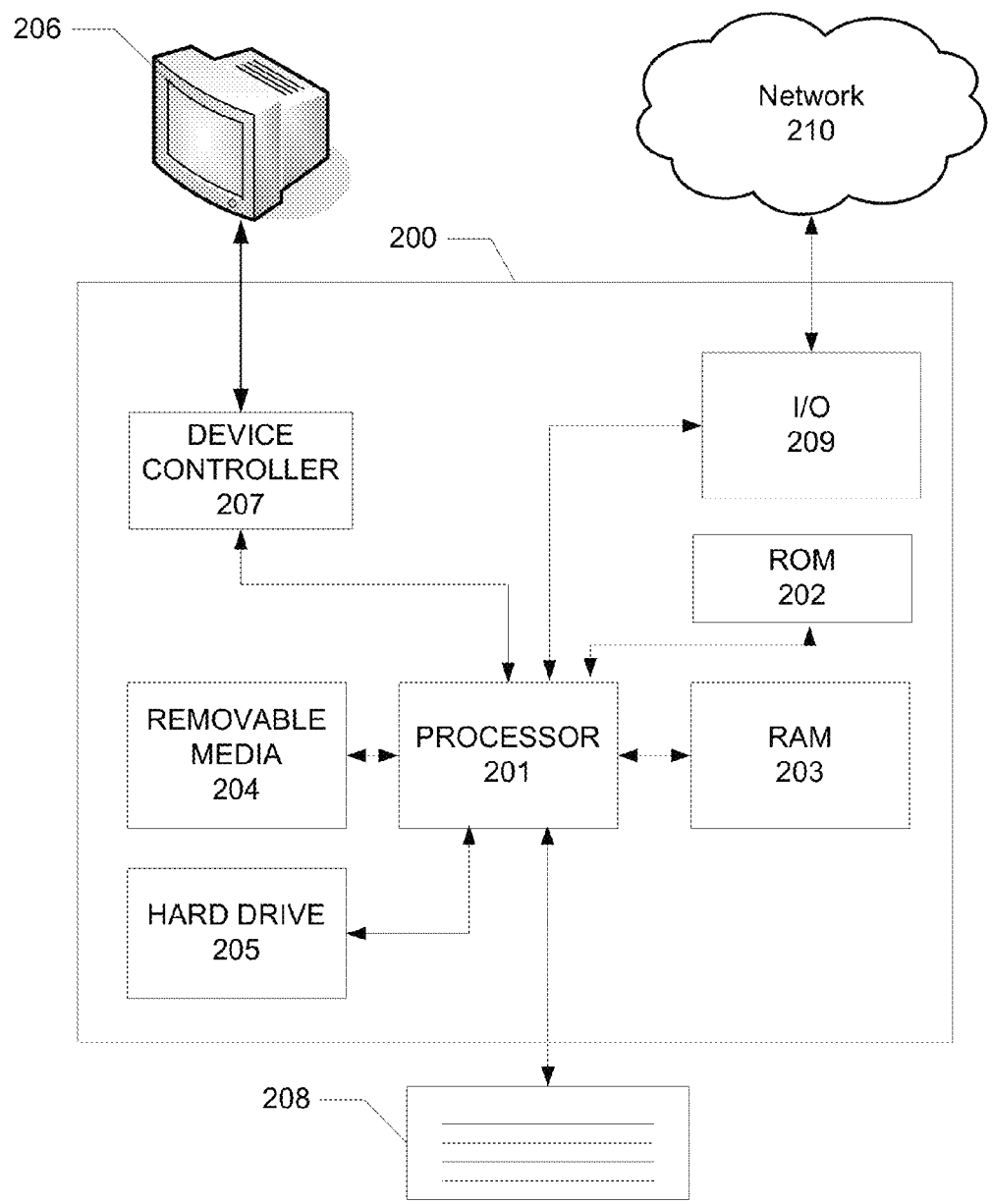
FIG. 2 illustrates an example platform on which the various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

By way of introduction, aspects of this disclosure may be implemented to combat any form of attack, such as a side channel analysis (SCA) attack. SCA attacks, and in particular differential power analysis (DPA) attacks targeting an encryption scheme, are described herein for purposes of illustrative simplicity and consistency. The architectures and methods may be adapted to provide coverage against any other type of attack in any application context.

Figure 3:
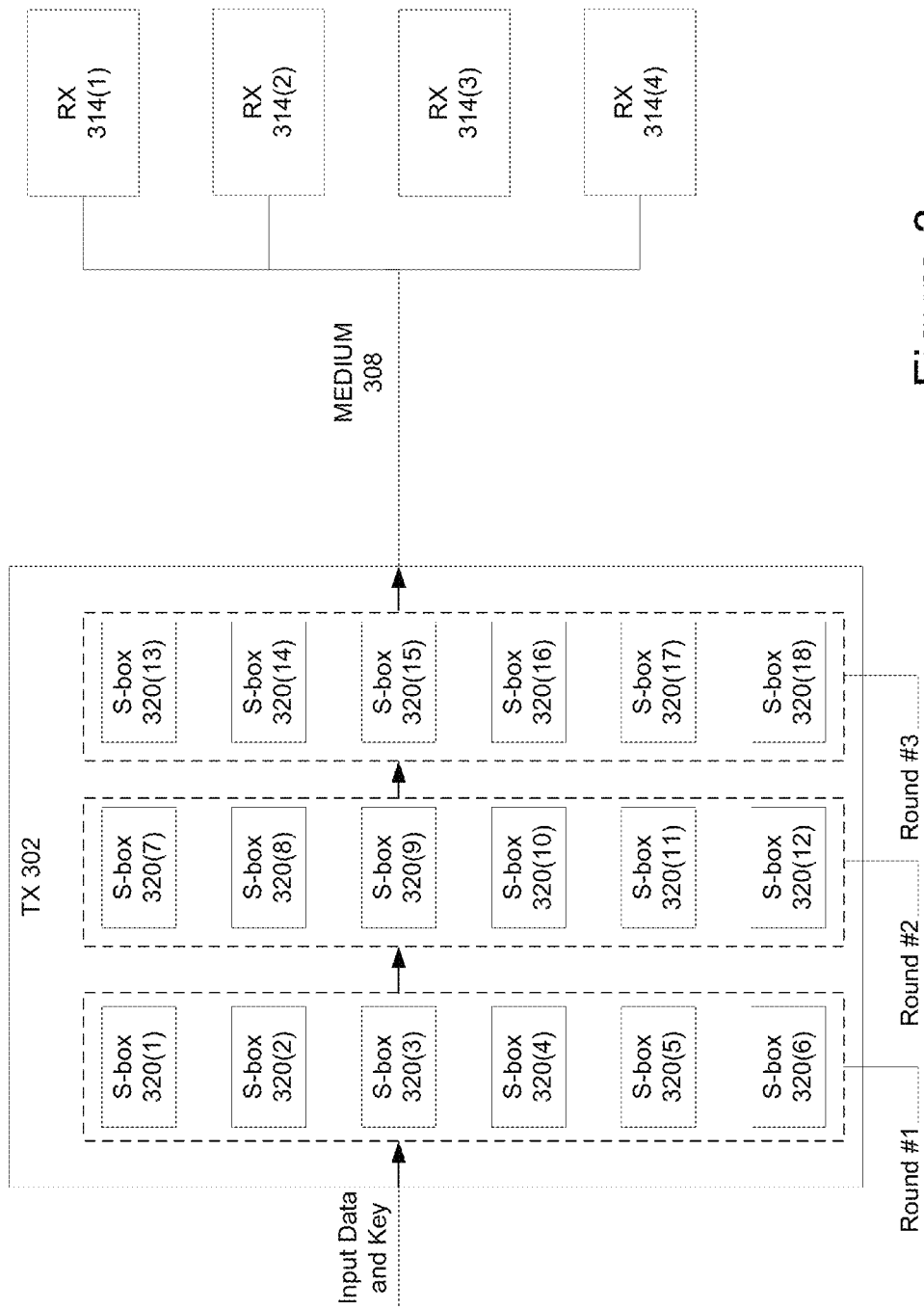
FIG. 3 illustrates an environment suitable for demonstrating one or more aspects of this disclosure.

FIG. 3 illustrates an architecture suitable for demonstrating one or more aspects of this disclosure. In some embodiments, the devices shown in FIG. 3 may be included in, or associated with, the components and devices described above in connection with FIGS. 1-2.

As shown in FIG. 3, a transmission device 302 may receive input data and one or more keys. In some embodiments, the data and one or more keys may be received together at device 302. In some embodiments, the data and one or more keys may be received separately at device 302. In some embodiments, the one or more keys may already be present at device 302 when the data is received (or vice versa).

Device 302 may communicate encrypted data to one or more reception devices 314 (four of which are shown) via a medium 308 (e.g., lines 101 of FIG. 1). In some embodiments, one or more of device 302 and/or devices 314 may include components and circuitry to support communication in more than one direction. For example, one or more of devices 302 and 314 may include components to support transmission and reception.

Device 302 may include, or be associated with, one or more devices, entities, or components, such as one or more substitution boxes (S-boxes) 320, which may be integrated with the transmission device 302, or alternatively, implemented separately from the transmission device. S-boxes 320 may be arranged in order to accommodate encryption via one or more rounds. For example, S-boxes 320(1) through 320(6) may be used to perform a first round of encryption on input data. The resulting output of S-boxes 320(1) through 320(6) may serve as input to a second set of S-boxes 320(7) through 320(12) used to perform a second round of encryption. The resulting output of S-boxes 320(7) through 320(12) may serve as input to a third set of S-boxes 320(13) through 320(18) used to perform a third round of encryption. While device 302 shown in FIG. 3 includes eighteen S-boxes (e.g., S-boxes 320(1) through 320(18)) organized as three rounds of six S-boxes per round, other variations are possible. For example, a greater or lesser number than eighteen S-boxes may be used in some embodiments. In some embodiments, a greater or lesser number than three rounds may be used. Increasing the number of rounds may improve security while decreasing performance. Similarly, decreasing the number of rounds may improve performance while decreasing security. In some embodiments, each round may include more or less than six S-boxes. In some embodiments, the number of S-boxes per round might not be the same.

In some embodiments S-boxes 320 may be implemented using a look-up table. In some embodiments, one or more of the rounds of S-boxes may represent execution of a process, algorithm, or calculation on a common platform (e.g., a common hardware platform) at particular points in time. Each of the S-boxes 320 may generate an output based on a key value and either the input data (in the case of the first round) or the output of one or more S-boxes 320 from the previous round. In one or more rounds, one or more bits of data may be changed (e.g., a bit value of '0' may be changed to a '1', or vice versa). In one or more rounds, a relative location of two or more bits may be switched (e.g., a bit in a bit position #7 may be changed with a bit in a bit position #2). In some embodiments, the encryption algorithm may provide a minimal (e.g., zero) correlation between the input data and the output data that is generated at the end of the last round. The encryption algorithm may also be a one-to-one reversible process, such that any combination of bits in terms of the input data will generate a unique output. A one-to-one reversible process may allow a reception device 314 to recover the original input data after receiving the encrypted data via medium 308. In some embodiments, the reception device 314 may also decrypt the received data, if necessary.

The specifics of the operation(s) or calculation(s) to be performed in each round may be determined by the encryption algorithm that is used. In some embodiments, the Data Encryption Standard (DES) or the Advanced Encryption Standard (AES) may be used to perform encryption. DES and AES are based on a symmetrical key algorithm. Other encryption algorithms may be used. For example, a public-private key algorithm, such as Rivest, Shamir and Adleman (RSA) encryption, may be used in some embodiments. In some embodiments, a public-private key encryption may be used to communicate a symmetric key, and then symmetrical key encryption (e.g., DES or AES) may be used to communicate a portion (e.g., the majority) of the data.

In some embodiments, an encryption operation may be triggered in response to any number of inputs or conditions. For example, an encryption operation may be based on a requestor ID, an incoming port on which a request is received, or a type of encryption requested.

Figure 4:
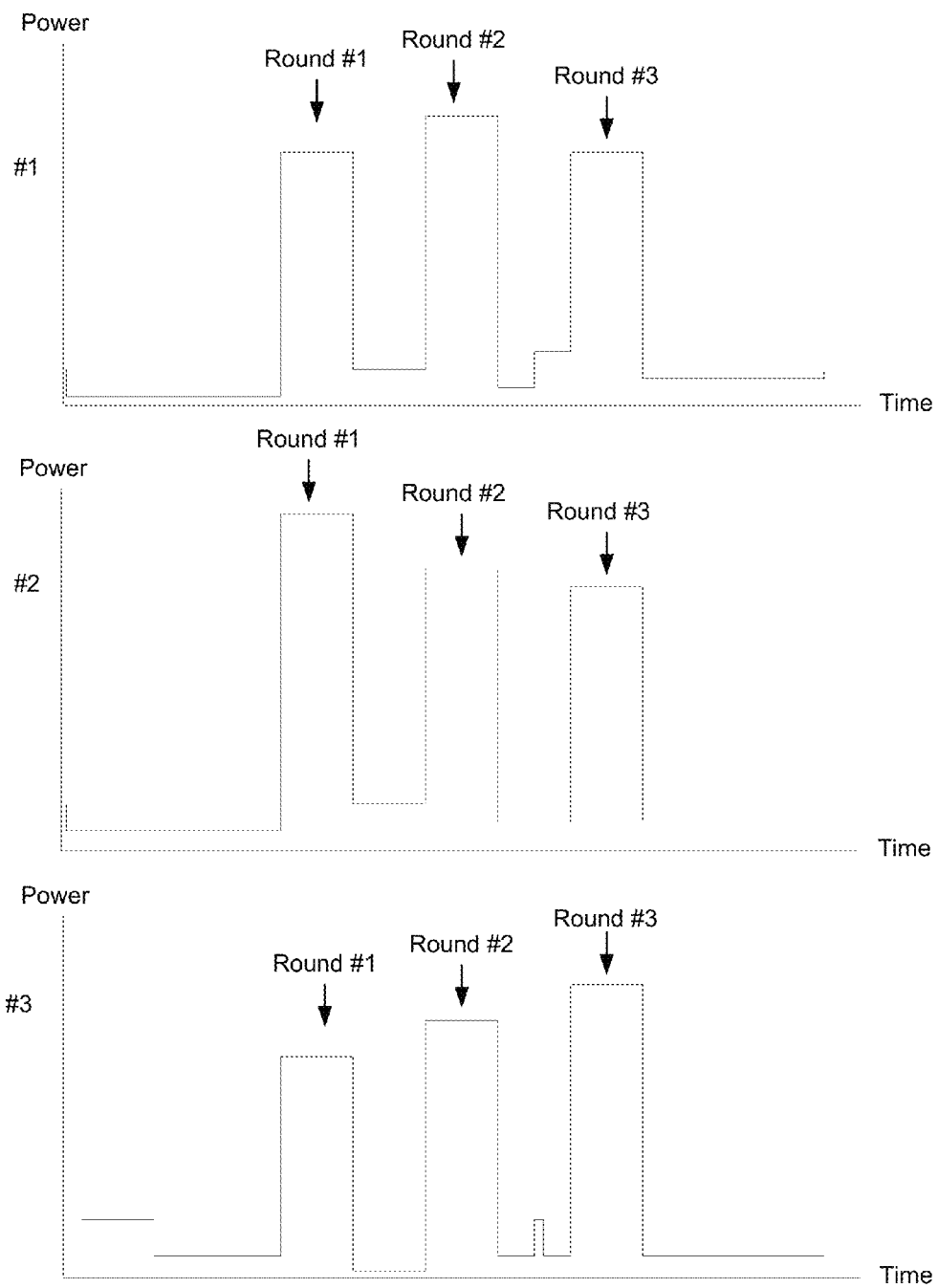
FIG. 4 illustrates a series of traces suitable for demonstrating one or more aspects of this disclosure.

FIG. 4 illustrates a series of traces that may be used to demonstrate one or more aspects of encryption that may be exploited by an attack, such as an SCA attack. In FIG. 4, three power traces (#1-3) are shown. Each of the three traces may be indicative of a power profile for a device (e.g., device 302 of FIG. 3) over particular periods of time. For example, the first trace may be indicative of power consumption by the device over a first period of time, the second trace may be indicative of power consumption by the device over a second period of time, and the third trace may be indicative of power consumption by the device over a third period of time. Actual values for the power and time are omitted from the axes in FIG. 4—the actual values may be a function of the physical elements or components making up hardware included in or associated with the device, the encryption algorithm used, other processes executing on the device, etc.

As shown in the power traces of FIG. 4, there are periods of relative low power consumption followed by bursts or spikes in terms of power consumption. The bursts or spikes in terms of power consumption may be indicative of a round executing with respect to one or more S-boxes (e.g., S-boxes 320 of FIG. 3). For example, the execution of a round may involve an activation of circuits (e.g., a switching of gates or transistors) that may result in consumption of power. As shown in FIG. 4, each of the power traces may have three "bursts" associated with them, corresponding to an execution of the three rounds associated with device 302 of FIG. 3.

An unauthorized user may determine when a round is executing (e.g., an unauthorized user may determine when a round starts and stops) by observing the bursts in the power profile. If the unauthorized user knows the encryption standard or algorithm that is used, then the unauthorized user can engage in a statistical analysis in order to recover a portion of a key (e.g., a subkey). For example, the unauthorized user can look at the first round corresponding to each power trace and guess or assume a value for a subkey. If the assumed value for the subkey is correct, then a recognizable signature will be produced at the output of a decryptor that is above normal background noise. If a recognizable signature is not generated, the assumed subkey may be modified (e.g., may be incremented) and the analysis may be repeated with respect to the first round. Alternatively, or additionally, rather than making a determination of whether a particular assumed value for a subkey generates a recognizable signature, the process may execute for all possible values of the subkey and the value for the subkey corresponding to the best, e.g., the most recognizable signature, may be selected.

Once a value for the subkey is assumed based on the statistical analysis of the first round, that assumed value for the subkey may be applied to the second (and subsequent) rounds to determine a next (and a successive) subkey until ultimately the key is recovered. Once the key is recovered or reverse engineered by the unauthorized user, the security of the communications may be compromised.

It should be noted that while three power traces are described above in connection with FIGS. 3 and 4, in practice an unauthorized user may collect on the order of one thousand traces in order to reverse engineer a key. Given the processing capabilities and large memory capacities available in modern computing devices, the collection and processing of such a relative large number of traces might not impose much of a challenge. The number of traces that may need to be collected to reverse engineer a key may be a function of the encryption algorithm used, such as the length (e.g., the number of bits) of the key, the number of rounds, etc.

While described above in terms of power (e.g., a differential power analysis (DPA) or a simple power analysis (SPA)), the unauthorized user may use any form of attack, such as any form of SCA attack, to reverse engineer a key.

In order to combat a reverse engineering of the key by an unauthorized user, a continuous exercise of hardware may take place at a device (e.g., device 302 of FIG. 3) in order to generate a profile (e.g., a power profile) that is indistinguishable in terms of when rounds are executing, and in particular, when any given round starts and stops. In other words, there may be no perceived breaks or interruptions in terms of the exercise of the hardware by a measurement device (e.g., a computer). In this manner, an unauthorized user might be unable to determine the time a particular S-box is being accessed, making SCA analysis and/or other hacking schemes ineffective.

In some embodiments, the continuous exercise of the hardware may increase the power consumption of the device in between rounds. For example, and referring to FIG. 4, the hardware may be exercised to eliminate the trough or dip between round #'s 1 and 2. In some embodiments, the exercise may correspond to a dummy operation intended to raise the power consumption during the period of time between round #'s 1 and 2. In some embodiments, the exercise of the hardware between round #'s 1 and 2 may correspond to a task, other than a real encryption computation, intended to achieve an actual or real result.

In some embodiments, the dummy cycles can be allocated to perform one or more different computations that may be unrelated to the primary encryption operation. For example, two or more encryption operations may be intermixed with one another, such that one or more rounds of a first encryption operation are mixed with one or more rounds of a second (or additional) encryption operation (with one occupying the dummy cycles of the other). In some embodiments, a priority-based scheme may be used. For example, a first encryption operation may be suspended (e.g., temporarily suspended) in favor of a second, higher priority encryption operation.

In some embodiments, and for example, in those embodiments where multiple encryption operations may be performed, a round-robin scheme may be used. In some embodiments, a round-robin distribution may be used to distribute one or more dummy cycles among a plurality of auxiliary computations. In some embodiments, a user or a network/service provider (or equipment associated therewith) may determine whether to use a round-robin scheme. An application may determine whether to use a round-robin scheme at one or more points in time, e.g., at a start of an operation. In some embodiments, a system configuration or parameters associated therewith may influence or determine whether a round-robin scheme is used. Although a round-robin scheme is an example, other non-sequential schemes may be used as well.

In some embodiments (e.g., in some embodiments implementing a round-robin scheme), rounds may be switched between requests. For example, a first cycle may complete a first order operation and then rotate to a next order based on how the encryption operation is triggered. A second cycle may perform all (or a subset of) the remaining rounds—this can be based on priority or when an operation is requested, for example. An encryption process may be intermixed with one or more processes at the same time. Processes can be distributed based on priority or on when a process is requested. For example, higher priority processes may execute first and lower priority processes may be mixed-in. More rounds may be assigned to higher priority processes relative to lower priority processes. Processes may also be request-based (e.g., first request, second request, etc.). Processes may be assigned randomly using a random source to allocate, e.g., a round-robin. Random selection might not be as predictable as other schemes, and as such, random selection might not be suitable for time critical operations. Order may be determined at a time of design.

In order to effectuate a continuous exercise of the hardware at the device, dummy keys and dummy input data values may be used. Randomly generated keys and randomly generated input data values are examples of dummy keys and dummy input values. The use of random keys and random input data are described below for purposes of illustration.

Figure 5:
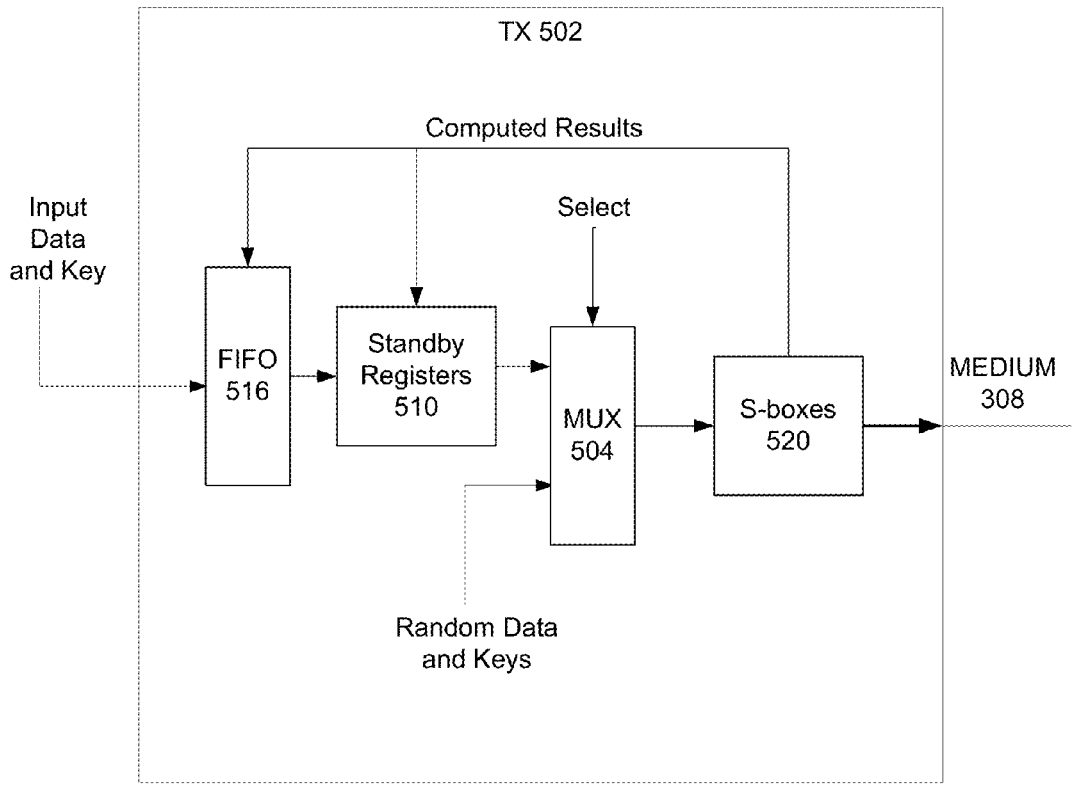
FIG. 5 illustrates a device suitable for demonstrating one or more aspects of this disclosure.

As shown in the example configuration of FIG. 5, a transmission device 502 (which, in some embodiments, may include components configured to function in a manner similar to transmission device 302 described herein) may include S-boxes 520 (which, in some embodiments, may include components configured to function in a manner similar to S-boxes 320 described herein) that may be exercised or accessed using random keys and random input data as part of a background operation or task (when the select line to a multiplexer 504 is a '1', for example). The background operation/task may be suspended when an actual or real encryption operation is to take place (when the select line to multiplexer 504 is a '0', for example). Standby registers 510 (optionally in connection with a first-in-first-out (FIFO) memory 516 or the like) may be used to store and/or queue the values of the data and/or key that are the inputs associated with a real encryption operation and/or computed results after various rounds of computation. In this manner, the switching between the background operation/task and the real encryption operations may be seamless in terms of the profile (e.g., power profile) generated by the device.

The components and devices shown in FIG. 5 are illustrative and are intended to reflect logic that may be used to thwart an attack, such as an SCA attack. In some embodiments, different components or devices may be used, and one or more alternative arrangements for the components or devices may be used. For example, in some embodiments an engine may be included. The engine may include hardware, software, and/or firmware. The engine may perform one or more operations or calculations. For example, the engine may perform encryption in some embodiments.

Figure 6:
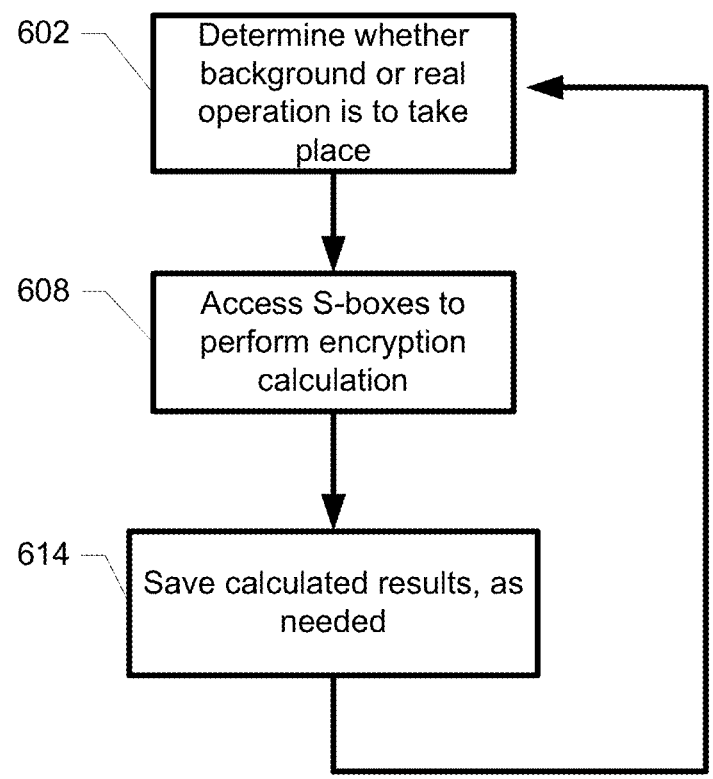
FIG. 6 illustrates a method suitable for demonstrating one or more aspects of this disclosure.

FIG. 6 illustrates an example method that may be used in accordance with one or more aspects of this disclosure. The method may be used to preclude a reverse engineering of a key. The method may execute in one or more environments, or on one or more platforms. For illustrative purposes, the method of FIG. 6 is described below in connection with the architecture shown in FIGS. 3 and 5.

In step 602, a device (e.g., device 302 or 502) may determine whether a background operation or a real or actual encryption operation is to take place and set an appropriate value for the select line to multiplexer 504. In some embodiments, a selection of a background operation or a real encryption operation may take place on a real encryption operation boundary, allowing all the rounds of a real encryption operation to occur before switching to the background operation (e.g., a real encryption operation may be completed from start to finish without interruption by a background operation).

In some embodiments, a switching between the background and the real encryption operation may take place after any particular round of the real encryption operation has completed; thus, the switching between the background and real encryption operations may occur multiple times during a single real calculation. For example, and briefly referring to FIGS. 3 and 4, after a real encryption operation takes place in round #1, a switching to a background operation may take place for a time period corresponding to the time between rounds #'s 1 and 2. Then, at a time when round #2 of the real encryption operation is to take place, another switching may take place to facilitate the calculation associated with that round of the real encryption operation.

In step 608, the S-boxes 320 or 520 may be exercised or accessed to perform an encryption calculation or computation. If a background operation is taking place (e.g., random values for the data and key are being used), then the results of the calculation may be ignored or discarded. In other words, if a background operation is taking place, then the results of the calculation may be ignored, as the calculated values may be irrelevant or unimportant. If a real operation is taking place (e.g., actual values for the data and key are being used), then the results of the calculation may be saved (in one or more registers or the like) in step 614 to support future calculations or a transmission of data. For example, the results of a real calculation may be saved in one or more of standby registers 510 and FIFO 516. In some embodiments, the result of the calculation may be saved irrespective of whether the calculation relates to a background operation or a real operation, and a flag or other indicator may also be saved to indicate whether the data is the result of a background calculation or a real calculation.

After the end of step 614, the flow may proceed to step 602, thereby setting up a loop. In this manner, a continuous exercise of the hardware may take place.

In some embodiments, the continuous exercise of hardware may include an immediate switching of actual and dummy values. Such switching may ensure that no clock cycles elapse between a real calculation and a background calculation, or between a background calculation and a real calculation. In some embodiments, to facilitate an immediate switching from a background calculation to a real calculation, a final clock cycle of a background calculation may be identified, and then the next clock cycle may be assigned to the real calculation. In some embodiments, to facilitate an immediate switching from a real calculation to a background calculation, a final clock cycle of a real calculation may be identified, and then the next clock cycle may be assigned to the background calculation.

In some embodiments, an encryption engine may be loaded with operands by a controller. The controller may signal the encryption engine to start. The controller may then wait for a notification from the encryption engine that a computation/calculation is complete and retrieve results (e.g., results from one or more rounds).

In some embodiments, a variable delay (e.g., a deterministic variable delay) may be added to the front and back of a given round to make it more difficult for someone (e.g., an attacker) to time the process. For example, a variable delay may be used to counter an attacker who may be able to reproduce a condition where an encryption operation would be triggered. Such a condition may include, for example, sending a message that would cause cryptographic operations to be performed. By measuring the time from the point of message transmission to the time when a reply becomes available, a reference window could be established within which the signal of interest had been captured. An example of such an operation would be a function that performs a message encryption/decryption with a specific private key.

Repeating the same operation with varying inputs (e.g., different messages), might cause the same cryptographic processing but with different inputs, and thus, might show the same window in aggregate, the same leading and trailing signal trace as the message parsing/processing and configuration of crypto engines, along with the post processing and result formatting because all messages are identical except for the input parameters for the crypto engines. However, the portion of the signal traces in the center of the window might show traces with large variation due to the inner calculation of each crypto operation being different due to the different input parameters. This could be seen on a scope configured to persistent mode and triggering on message transmission with multiple traces captured and displayed.

Therefore, inserting additional delay before and after a crypto operation might make the timing more difficult for an attacker. However, random delays might not be sufficient because the attacker could send in the same message multiple times and the randomness could be eliminated using correlation analysis to leave the true trace exposed. This would increase the work factor for an attacker but fundamentally adds little security given the availability of statistical analysis software and high powered computing that is available. Thus the delay may be designed so as to be deterministic, such that for each message, a delay may be added before and after a crypto operation. In this manner, no matter how many times the same identical message is used, it may always produce the same signal trace. But, for a different input parameter, a different delay may be used so that the process of correlating all captured traces could not proceed due to the difficulty of aligning the start of crypto operations for all of them.

In some embodiments, a deterministic delay length may be implemented using a cyclic redundancy check (CRC) of an input parameter to the crypto operation. For example, a DES input might be 64 bits and with a 16-bit CRC, which could be truncated to the lower 10-bit value, an insertion of zero to 1023 clocks may be used. In some embodiments, other schemes may be used. For example, for improved security a scheme that could not be guessed easily might be preferred. In some embodiments, a linear feedback shift register (LFSR) based scheme may be used to determine delays.

In some embodiments, random dummy rounds may be inserted during an encryption operation. Adding such random dummy rounds may increase the complexity of an analysis that an attacker would need to engage in to reverse-engineer a key or other secret.

While some examples have been described above in the context of television technology and communications, aspects of this disclosure may readily be applied to, and adapted to be operative on, one or more other communication systems. Those communication systems may include computer networks, satellite networks, cellular networks, and the like.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware, and/or hardware aspects. The functionality may be resident in a single computing device or application, or may be distributed across multiple computing devices/platforms or applications, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.). As described herein, hardware may be exercised in such a manner that a profile that is generated is indistinguishable in terms of when an actual or real encryption calculation is taking place. In this manner, the integrity of communications may be preserved by thwarting a reverse engineering of a key. The techniques described herein may be leveraged to a variety of application contexts, such as network security, e-commerce, and banking.

The methodological acts and processes described herein may be tied to particular machines or apparatuses. For example, as described herein, applications may execute on one or more devices, such as servers and user devices. The applications may be formatted in accordance with one or more communication or encryption techniques, types, or protocols. More generally, one or more computers may include one or more processors and memory storing instructions, that when executed, perform the methodological acts and processes described herein. Furthermore, the methodological acts and processes described herein may perform a variety of functions including transforming an article (e.g., a profile of hardware reflecting the use of a particular key) into a different state or thing (e.g., a profile of hardware in which a key used cannot be determined).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

What is claimed is:

1. A method comprising:
   sequentially executing a plurality of dummy rounds on one or more computers;
   receiving real data to be encrypted;
   suspending sequentially executing the dummy rounds and executing an encryption operation comprising:
   a first plurality of encryption rounds using the real data, wherein a result of executing one encryption round of the first plurality of encryption rounds is used in executing a subsequent encryption round of the first plurality of encryption rounds;
   a second plurality of encryption rounds using dummy data, wherein one or more of the second plurality of encryption rounds are executed in between any two sequential rounds of the first plurality of encryption rounds; and, wherein one or more of the second plurality of encryption rounds are executed in between any two sequential rounds of the first plurality of encryption rounds; and
   one or more delay periods, wherein an amount of time associated with each of the one or more delay periods is determined based on the real data; and
   resuming sequentially executing the dummy rounds after executing the first plurality of encryption rounds.

2. The method of claim 1, further comprising:
   selecting a real key; and
   executing the first plurality of encryption rounds using the real data and the real key.

3. The method of claim 1, further comprising:
   determining randomly whether to perform one of the first plurality of encryption rounds or one of the second plurality of encryption rounds.

4. The method of claim 1, further comprising:
   determining a sequence of the first plurality of encryption rounds and the second plurality of encryption rounds using a round-robin scheme.

5. The method of claim 1,
   wherein a timing associated with executing the first plurality of encryption rounds and executing the second plurality of encryption rounds is based on maintaining a constant power profile of the one or more computers.

6. The method of claim 1, wherein determining the amount of time associated with each delay period based on the real data is a deterministic operation such that a same amount of time is determined for same values of real data.

7. The method of claim 1, wherein the amount of time associated with each of the one or more delay periods is determined based on a cyclic redundancy check of a parameter associated with the real data.

8. The method of claim 1, wherein the amount of time associated with each of the one or more delay periods is determined using a linear feedback shift register (LFSR) based scheme.

9. A method comprising:
   receiving real data;
   executing, by one or more computers, a first plurality of encryption rounds using the real data, wherein a result of executing one encryption round of the first plurality of encryption rounds is used in executing a subsequent encryption round of the first plurality of encryption rounds;
   executing, based on a power consumption level of the one or more computers, a second plurality of encryption rounds using dummy data, wherein one or more of the second plurality of encryption rounds are executed in between any two sequential rounds of the first plurality of encryption rounds; and
   waiting a delay amount of time in between executing any two sequential encryption rounds, wherein the delay amount of time is determined based on the real data.

10. The method of claim 9, further comprising:
    selecting a real key to be used in the first plurality of encryption rounds with the real data; and
    executing the first plurality of encryption rounds using the real data and the real key.

11. The method of claim 9, wherein the delay amount of time is determined based on a cyclic redundancy check of a parameter associated with the real data.

12. The method of claim 9, wherein the delay amount of time is determined using a linear feedback shift register (LFSR) based scheme.

13. The method of claim 9, wherein executing the first plurality of encryption rounds using the real data is performed in between a plurality of auxiliary background operations, further comprising:
    selecting, based on a priority of the real data, as a next operation one of an encryption round of the first plurality of encryption rounds or an auxiliary background operation of the plurality of auxiliary background operations; and
    executing the selected next operation.

14. A method comprising:
receiving real data;
executing, by one or more computers, one or more first encryption rounds using the real data;
determining, based on a power consumption level of the one or more computers, to execute one or more second encryption rounds using dummy data;
executing the one or more second encryption rounds;
subsequent to executing the one or more second encryption rounds, executing, by the one or more computers, one or more third encryption rounds using a result of the first encryption rounds; and
waiting, by the one or more computers, a delay amount of time between any two sequential encryption rounds, wherein the delay amount of time is determined based on the real data.

15. The method of claim 14, wherein the one or more first encryption rounds and the one or more third encryption rounds are each rounds of a single encryption operation using the real data.

16. The method of claim 15, further comprising:
determining randomly when to perform the one or more second encryption rounds during the single encryption operation.

17. The method of claim 14, further comprising:
selecting a real key; and
executing the one or more first encryption rounds and the one or more third encryption rounds using the real data and the real key.

18. The method of claim 14, wherein determining to execute the one or more second encryption rounds is based on maintaining a constant power profile of the one or more computers.

19. The method of claim 14, wherein the delay amount of time is determined based on a parameter associated with the real data.

20. The method of claim 14, wherein the delay amount of time is determined based on a cyclic redundancy check of a parameter associated with the real data.

* * * * *